UNITED STATES PATENT OFFICE.

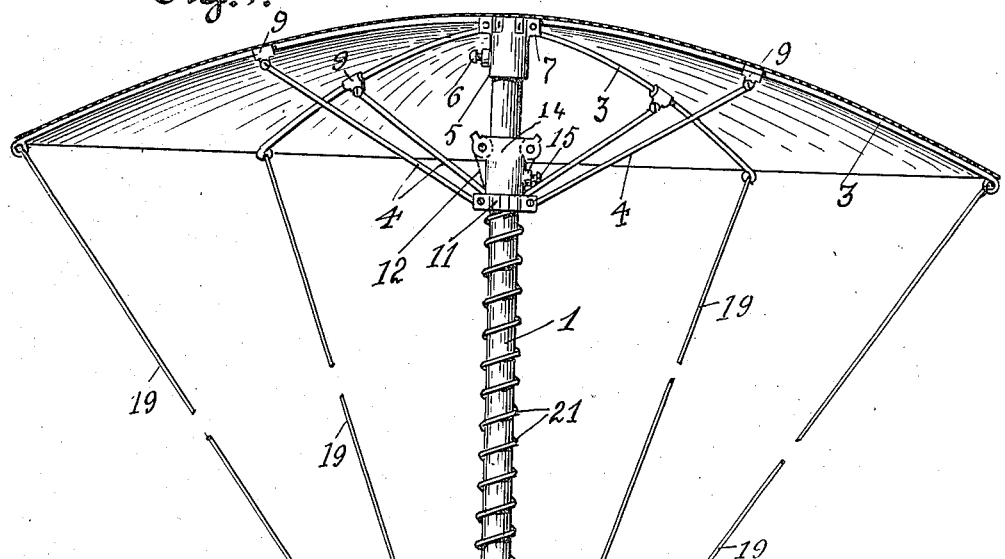
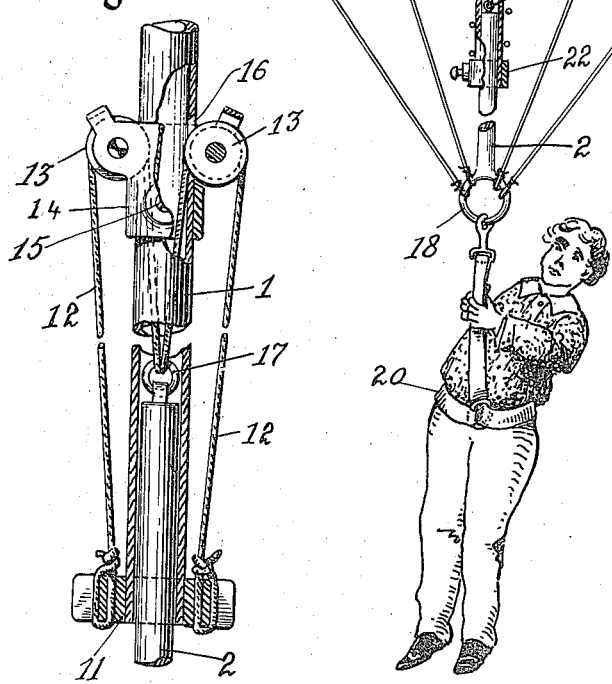
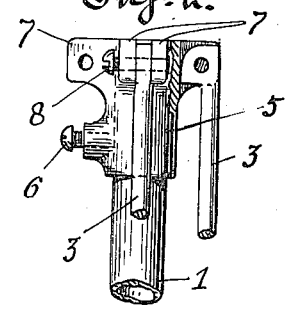
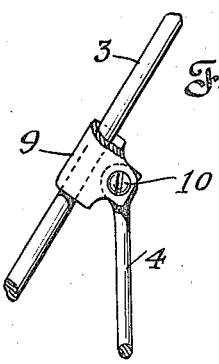

JOHN BURNS, OF LOS ANGELES, CALIFORNIA.

PARACHUTE.

996,058.  Specification of Letters Patent.  Patented June 27, 1911.

Application filed December 27, 1910. Serial No. 599,240.

*To all whom it may concern:*

Be it known that I, JOHN BURNS, a citizen of the United States, residing at Los Angeles, in the county of Los Angeles and State of California, have invented new and useful Improvements in Parachutes, of which the following is a specification.

This invention relates to parachutes such as are used by aeronauts in making ascents. The device is intended to be especially useful in making descents from aeroplanes, dirigible balloons, or buildings and the like.

The object of the invention is to provide a parachute for this purpose with improved means for opening the same and for supporting a load therebelow and it is a further object of the invention to provide removable means for holding the ribs and other portions of the parachute whereby the parts may be adjusted for the use of a greater or less number of parts as found desirable.

In the drawing forming a part of the annexed specification, Figure 1 is a vertical sectional view through the improved parachute constructed in accordance with the present invention, some of the parts being shown in elevation. Fig. 2 is an enlarged detail view of the upper end of the parachute spindle showing the removable means for holding the ribs of the parachute. Fig. 3 is an enlarged detail sectional view partially in elevation illustrating the mechanism for raising or supporting the parachute, a portion of the parachute spindle being broken away. Fig. 4 is an enlarged detail view showing one of the adjustable connections upon a rib for connecting the same to a spreader.

Referring more particularly to the illustration in which is shown the preferred form of the mechanism, 1 indicates a tubular spindle, 2 a draw rod telescoping therein, 3 ribs and 4 spreaders connected therewith. The tubular spindle is provided at its upper end with a removable and adjustable sleeve 5 which is adapted to carry the ribs 3 of the parachute. The said sleeve 5 is provided with a body portion of ample length to be firmly secured upon the end of the tubular spindle 1 and it is clamped thereon, usually by means of a screw as 6, which has a threaded bearing in the walls of the said sleeve 5. The upper end of the sleeve is formed with a series of rib receiving jaws 7 between which the ends of the ribs 3 are pivoted. The pivots for these ribs are preferably removable screws 8 as clearly shown in Fig. 2.

By providing a parachute with interchangeable sleeves for carrying the ribs and having greater or less number of the rib-receiving jaws or lugs, the number of ribs employed in the parachute may be altered by taking out one sleeve and substituting another. The spreaders 4 are also adjustably connected with the ribs 3 by means of clips or fastenings 9 which are usually U shaped pieces adapted to surround the ribs 3, their free ends being drawn together so as to pinch the ribs 3 by the pivot screws 10 which also secure the upper ends of the spreaders 4 to the said ribs. By loosening the screws 10 the clips 9 may be slipped to another point upon a rib and clamped thereto again. The extent to which the ribs may be spread or bowed can thus be adjusted quickly and rigidly by the setting of clips 9 at desired points on the ribs.

The spreaders 4 are pivotally connected at their lower ends to a sliding collar 11 which fits upon the tubular spindle 1 and has a sliding engagement therewith. The said collar 11 is provided with the same number of spreader receiving recesses and pivot pins, as there are rib receiving recesses upon the sleeve 5 so that the same number of spreaders may always be employed as there are ribs used in the parachute.

The collar 11 is connected with the draw bar 2 within the hollow spindle 1 by means of cords 12 which are connected to the said collar 11 at one end and which thence pass over pulleys 13 journaled in the upper portion of the sleeve 14. The said sleeve 14 is clamped upon the hollow spindle 1 usually by means of a set screw 15, at such a position that the pulleys will come opposite openings or slots 16 formed in the walls of the said spindle 1. In passing over the pulleys 13, the cords extend downwardly through the spindle 1 and are connected to the upper end of the plunger 2, usually by means of a ring 17 or other desired means. The lower end of the draw bar 2 is formed with a large eye or handle 18 to which the load to be supported by the parachute can be securely attached. The outer end of the ribs 3 are connected by means of bracing cords 19 with the said eye 18 as clearly illustrated in Fig. 1. These cords 19 firmly brace the ribs with respect to the draw bar and yet do not prevent the folding of the parachute when not in use. A person, or other weight or load provided with any suitable attaching belt or mechanism as 20 is connected with the eye 18 in any desirable manner when a descent is to be made.

To insure the quick opening of the parachute a coiled spring as 21 is arranged about the hollow spindle 1 and at its lower end braces against a collar 22 clamped upon the lower end of the said spindle while its upper end exerts a spring pressure against the under side of the sliding collar 11. The spring thus assists in the spreading of the chute by forcing the said collar upwardly. When the parachute is folded, the said spring is compressed upon the spindle between the collar 11 and the collar 22, the said parachute being held in its folded position in any desired manner and usually by a band placed around the folded lower ends of the ribs within the easy reach of the operator when it may be cut and the parachute permitted to unfold. The ribs 3 are of course covered with any usual flexible fabric suitable for such purposes.

What I claim is:—

1. A parachute comprising a hollow spindle, a weight supporting plunger moving therein for spreading the parachute, a rib-carrying adjustable sleeve secured to said spindle, and means for holding the ribs in their spread positions.

2. A parachute comprising a hollow spindle, a weight carrying plunger moving therein, a rib-carrying head adjustably connected with the said spindle, means for removably securing ribs therein, parachute ribs pivoted to said head, and movable means connected with the weight receiving plunger and said ribs for maintaining the parachute in a spread condition when in use.

3. A parachute comprising a spindle, a rib carrying head removably secured thereto and having rib sockets formed therein, parachute ribs removably pivoted in said sockets, a sleeve having a sliding engagement with said spindle, spreaders adjustably connected with said ribs, and having a pivoted connection with the sleeve which slides upon said spindle, and means for disposing the weight of the load carried by the parachute upon the mechanism so as to raise the said sliding sleeve, and tend to hold the parachute in its spread position.

4. A parachute comprising a spindle, a cover carried thereby, means for spreading the same comprising ribs adjustably secured to said spindle, a sliding collar moving on the spindle, spreaders connecting the same with the ribs, adjustable clips being interposed between the ribs and the said spreaders, and means for placing the pull of the load partially upon said collar for spreading the parachute, and partially upon the ribs tending to pull the outer edge of the said parachute downwardly.

5. A parachute mechanism comprising a hollow spindle, a weight carrying plunger moving therein, a folding parachute supporting mechanism mounted upon the spindle, a movable collar for opening or folding the same, cords connecting said collar with the plunger, the said cords extending over anti-friction means mounted upon the walls of the spindle.

6. A parachute mechanism comprising a folding air engaging portion having ribs and spread bars, a movable collar carrying said spreading bars, a hollow spindle guiding said collar, a sleeve adjustably mounted upon said spindle and having pulleys arranged opposite apertures in the walls of the spindle, a weight carrying plunger moving in said spindle and cords connecting the plunger with the said collar, the said cords passing over the said pulleys and through the apertures in the walls of the spindle.

7. A parachute mechanism comprising the air engaging folding means having ribs carrying the same, a hollow spindle supporting said folding means and the said ribs, a movable plunger mounted in the said spindle, bracing cords connecting the outer ends of the ribs with the said plunger, and spring means mounted on the spindle and normally tending to open the said air engaging means.

In witness that I claim the foregoing I have hereunto subscribed my name this 15th day of December, 1910.

JOHN BURNS.

Witnesses:
 EDMUND A. STRAUSE,
 EARLE R. POLLARD.